Oct. 1, 1935.  T. A. MITCHELL  2,015,687
ORE TREATMENT APPARATUS
Filed Feb. 21, 1934   5 Sheets-Sheet 4
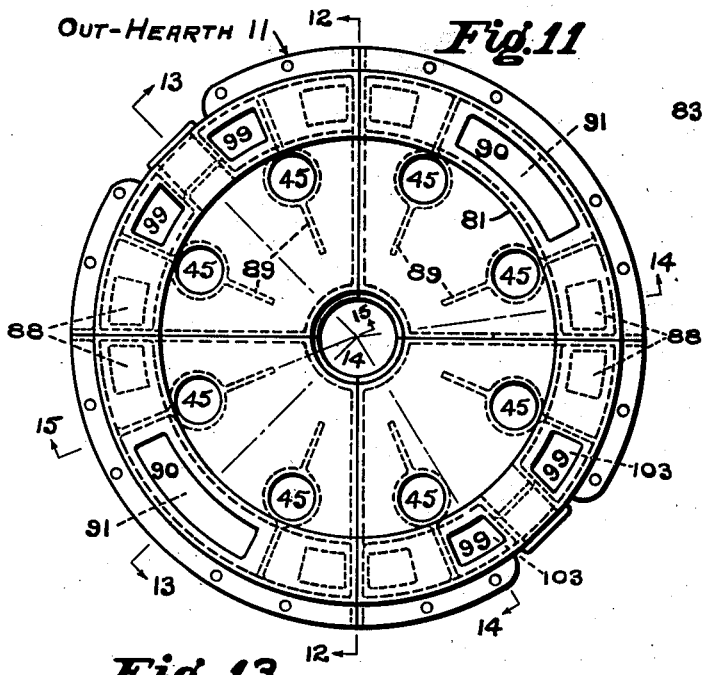
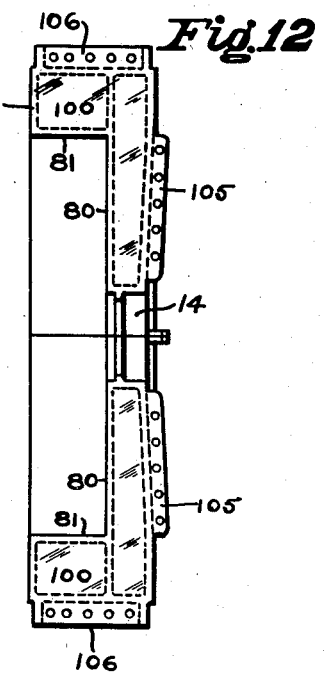
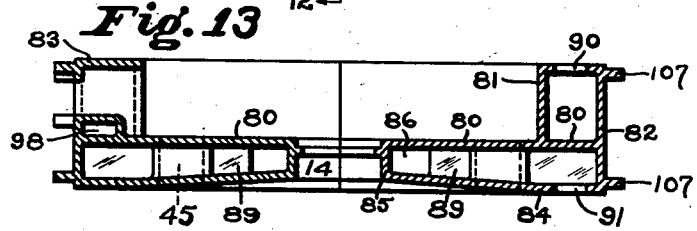
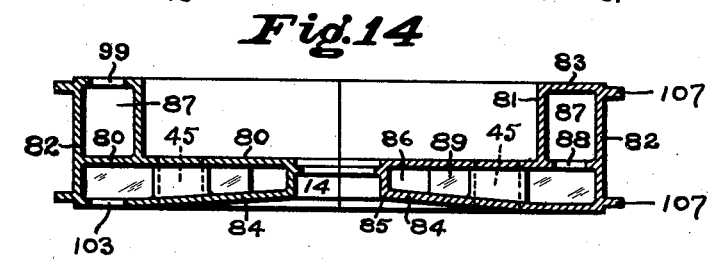
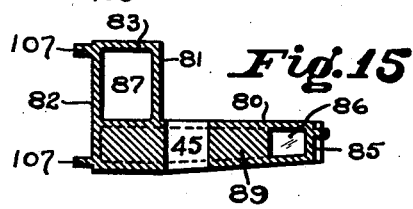
Inventor
THOMAS A. MITCHELL
By Clayton L. Jenks
Attorney

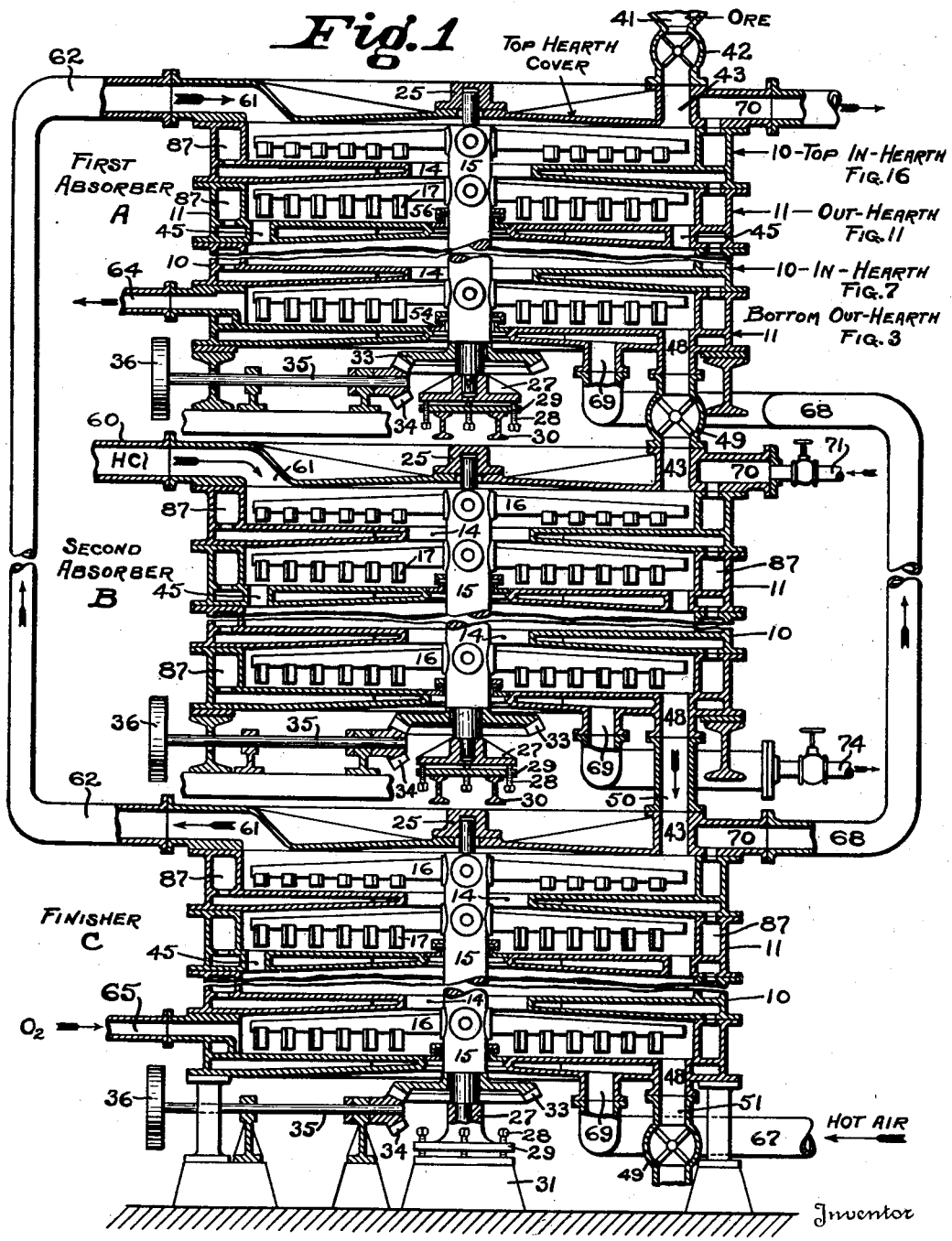

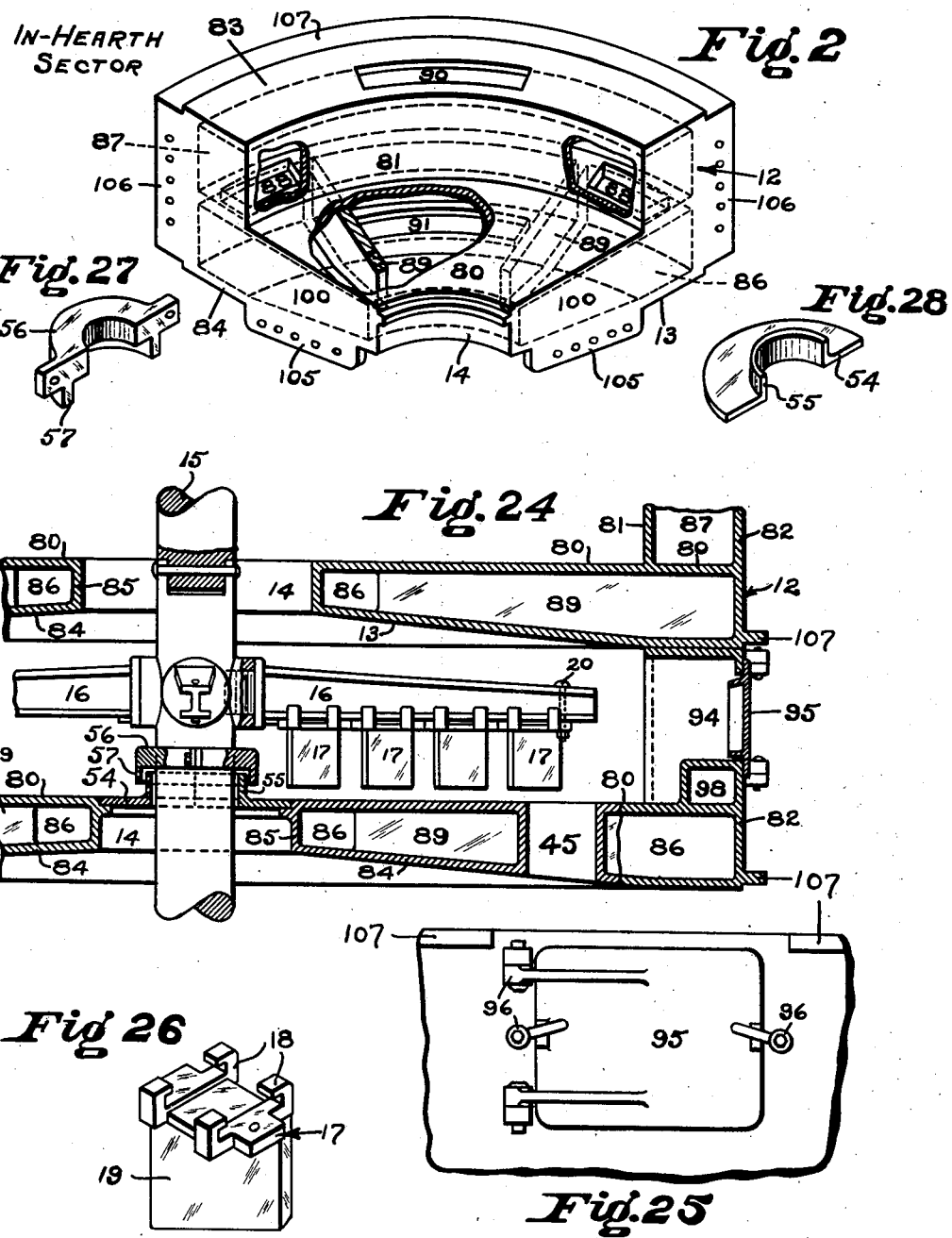

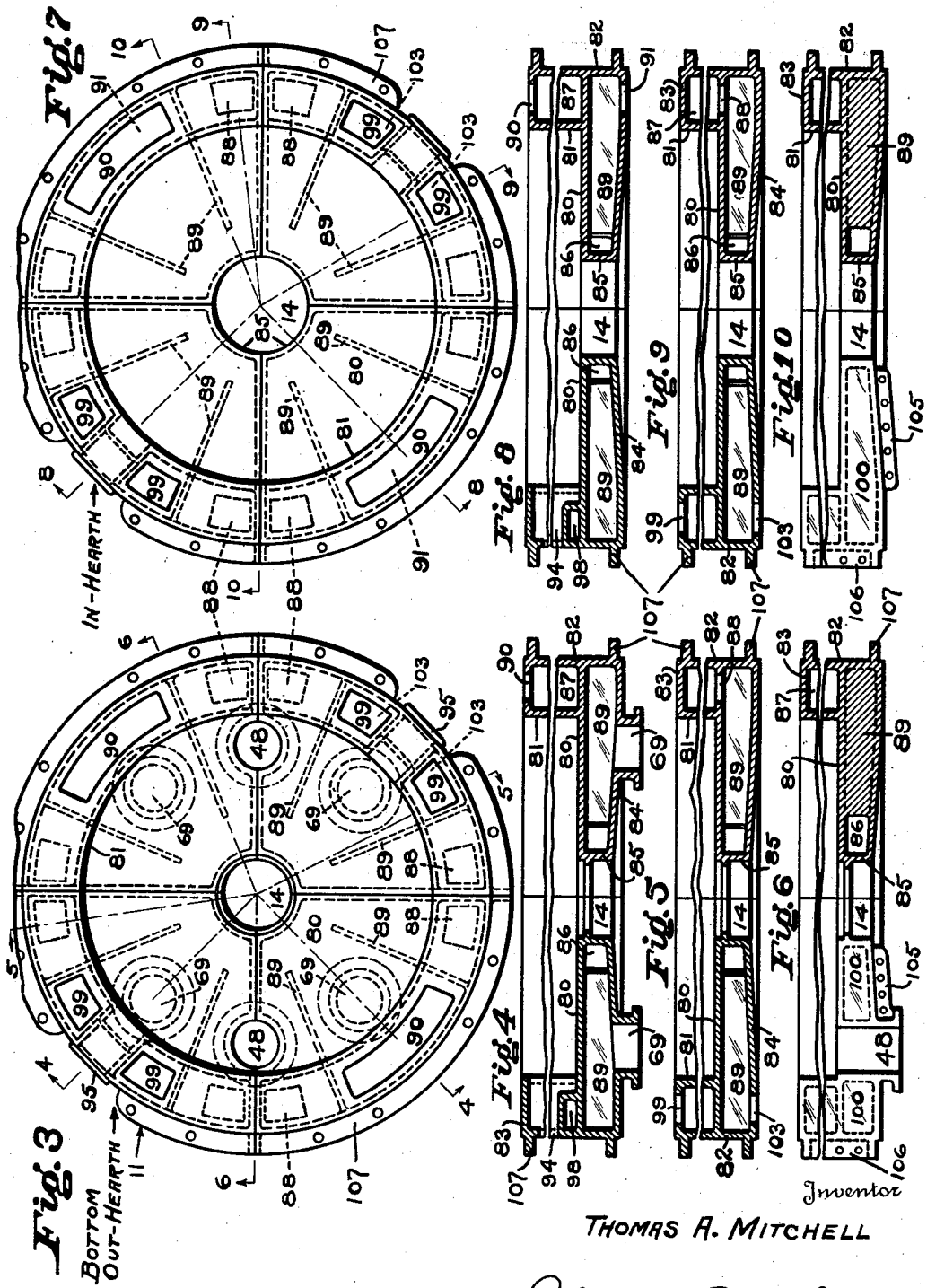

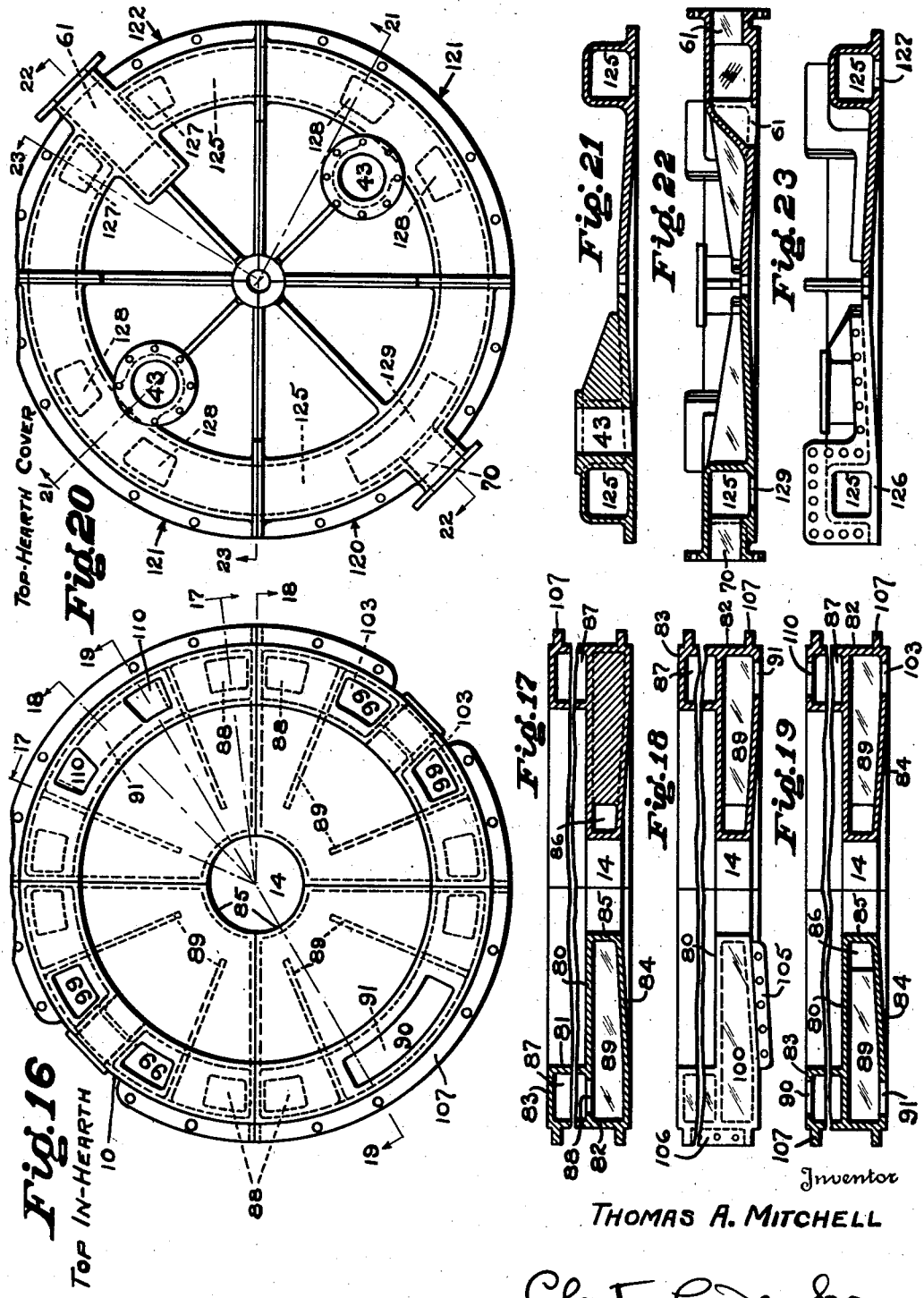

Patented Oct. 1, 1935

2,015,687

UNITED STATES PATENT OFFICE 2,015,687

ORE TREATMENT APPARATUS

Thomas A. Mitchell, Denver, Colo., assignor to Hughes-Mitchell Processes, Incorporated, Denver, Colo., a corporation of Wyoming Application February 21, 1934, Serial No. 712,297

15 Claims. (Cl. 257—118)

This invention relates to an apparatus for chemically treating various ore materials, and more particularly to a multiple unit apparatus which is so constructed that ores may be progressively treated as they flow from one unit to another and desired ingredients thereof may be suitably converted to soluble compounds, such as the ore metal chlorides.

The progressive chemical treatment of an ore material, such as a roasted sulfide ore or other oxidized ore material, may involve subjecting the ore to various gases, such as chloridizing reagents, which require different temperature and atmospheric conditions at various stages of the process. For example, it has been proposed to treat an oxidized ore, such as a complex roasted sulfide ore, as set forth in the patent of Mitchell No. 1,979,281, by passing the ore progressively through two absorbers and a finisher, wherein the ore is initially subjected in the first absorber to the chloridizing action of the waste gases from the finisher and second absorber, and it is then treated in intimate mixture with ferric oxide by means of strong hydrochloric acid gas to form ferric chloride, after which the ore is heated with air to a temperature at which ferric chloride reacts to form nascent chlorine and thus chloridize the refractory values of the ore material.

The primary object of this invention is to provide a suitable apparatus for effecting such a chloridizing operation or the treatment of ores with various gases, such as the sulfur-oxygen gases, and which may be used in other chemical procedures such as are required in dehydrating or drying various materials, as well as for many other purposes.

A further object of the invention is to provide an apparatus capable of use on a commercial scale which is made of separate units of such construction and arrangement that the entire apparatus may be readily assembled and operated in desired but variable unit sizes, so that one may treat either large or small quantities of the material, as desired, or subject the material to a longer or shorter time of treatment at any stage in the process.

Another object is to provide a multiple unit apparatus in which the material being treated by gaseous reagents may be agitated and fed progressively through each unit at a rate which is independent of that involved in the other units.

A still further object involves the provision of a multiple unit apparatus in which each unit may have its temperature separately controlled and regulated independently of that in the other units, and which in particular may be so arranged that an ore material may be subjected to an intermediate cooling operation between two heating steps and in which the heating and cooling agents are not allowed to contact with the ore or to dilute the reagent gases.

With these and other objects in view, as will be apparent in view of the following disclosure, this invention resides in the combination of parts set forth in the following specification and as covered by the claims appended hereto.

Referring to the drawings, which illustrate one embodiment of this invention, and in which like reference numerals indicate like parts:

Fig. 1 is a vertical section through an assembled apparatus, but with various parts shown diagrammatically or out of true proportion and otherwise modified in order to indicate the operation of a device of this type;

Fig. 2 is an isometric view, partly in section, of one of the quadrant sector castings which are employed in the assembly to form the hearth and reaction chamber;

Fig. 3 is a top plan view of one of the bottom hearths in each of the three assembled sets of units;

Figs. 4, 5, and 6 are vertical sections, partly broken away, on the lines 4—4, 5—5, and 6—6 of Fig. 3;

Fig. 7 is a top plan view of what is termed an in-hearth, in which the ore is fed inwardly towards a central discharge opening;

Figs. 8, 9, and 10 are vertical sections, partly broken away, on the lines 8—8, 9—9, and 10—10 respectively of Fig. 7;

Fig. 11 is a top plan view of a hearth termed an out-hearth, in which the ore material moves outwardly from the center towards the side ports near the periphery of the reaction chamber;

Fig. 12 is a side elevation of two of the assembled units, looking in the direction of the arrows 12—12 in Fig. 11;

Figs. 13, 14, and 15 are vertical sections, on the lines 13—13, 14—14, and 15—15 respectively of Fig. 11;

Fig. 16 is a top plan view of the top hearth of each of the three sets of units shown in Fig. 1;

Figs. 17, 18, and 19 are vertical sections, partly broken away, taken on the lines 17—17, 18—18, and 19—19 of Fig. 16;

Fig. 20 is a top plan view of the top hearth cover for each of the three sets of units;

Figs. 21, 22, and 23 are vertical sections on the lines 21—21, 22—22, and 23—23 of Fig. 20;

Fig. 24 is a detail in vertical section, partly broken away, of two hearths, showing the arrangement of the rakes on the driving shaft and the inspection doors of the reaction chamber;

Fig. 25 is a further detail, showing the door in vertical elevation;

Fig. 26 is an isometric view of one of the rakes shown in Fig. 24; and

Figs. 27 and 28 are isometric views of the cover plate and collar which prevent material from passing downwardly around the rake arm driving shaft.

In accordance with one aspect of this invention, an apparatus has been provided, as shown diagrammatically in Fig. 1, which will serve for chloridizing an oxidized ore, or for various other chemical purposes. This apparatus comprises in general three separate multiple hearth units, a first absorber A, a second absorber B and a finisher C, through which the ore is passed progressively by means of revolving rake arms. Each unit comprises a hearth carrying the ore material which is progressively fed through openings into the next hearth chamber below, while it is being subjected to the action of various gases introduced directly into the reaction chamber for the purpose. Each reaction chamber is heated or cooled by means of a heat interchange medium carried within the jacketed walls of the hearth unit. Various arrangements for heating and cooling the different units may be employed.

As indicated in Fig. 1, each of the multiple hearth units A, B, and C of the assembled apparatus comprises, in general, a series of in-hearths 10 and out-hearths 11, each of which is made up of a plurality of sector castings (Fig. 2) assembled to form the reaction chambers. Each hearth unit sector is a hollow walled body substantially L-shaped in cross-section, of which the hollow side walls 12 form the peripheral wall of a reaction chamber and the hollow bottom of each hearth 13 constitutes the bottom and the top of two adjacent reaction chambers. Each hearth sector is so shaped that a plurality, and preferably four, of them may be assembled to form the hearth unit; and the parts are so made as to interfit properly and prevent the escape of gases and the heat transfer medium. Each of the in- and out-hearths, formed of the multiplicity of sectors, is provided with a central opening 14, through which extends a vertical driving shaft 15.

This shaft 15 carries radially extending rake arms 16 suitably secured thereto and on which are mounted rakes 17 of the type shown in Figs. 24 and 26. Each rake arm 16 is preferably shaped as an I-beam, on the lower flange of which the U-shaped clips 18 (Fig. 26) are arranged to slide and carry the rakes depending therefrom. The depending blade 19 of each rake is arranged at an angle of 45° to its support, and it may be reversed in position to move the material either inwardly or outwardly as the rake arm is revolved. A removable bolt 20 (Fig. 24) serves to hold the assembled rakes on the arm 16.

Each of the multiple hearth units has a separate shaft 15 so that the rakes in each unit may be separately controlled. A bearing cap 25 carried by the top wall of each of the units (Fig. 1) radially supports the upper end of each shaft, and a suitable radial and end thrust bearing shoe 27 carries the lower end of each shaft. This lower bearing is made vertically adjustable in order that the distance between the lower ends of the rakes and the hearth bottoms may be varied. To this end, the bearing shoes 27 are supported on a set of screws 28 passing through screw threaded plates 29 which are suitably mounted on I-beams 30 (units A and B) and the concrete column 31 (unit C).

In order to drive each of these separate sets of rake arms and their corresponding shafts 15, bevelled gears 33 are slidably mounted on and keyed to each of the shafts and arranged to mesh with bevelled gears 34 mounted on the ends of the short cross shafts 35 which are suitably supported, as illustrated, and are adapted to be driven by pulleys 36 and belt connections or other suitable mechanism. It is to be appreciated that each of these shafts may be rotated at any desired speed independently of the rate of the other shafts. Hence, the ore material may be independently agitated and fed in each unit at any desired rate, depending upon the chemical reactions taking place.

As indicated in Fig. 1, the ore may be fed from the hopper 41 through a suitable, positively rotated gas valve 42, which prevents the escape of the reagent gases, and then through the port 43 in the top cover plate, details of which are shown in Figs. 20 and 21. Two of such ore feeding passages may be provided, as indicated in Fig. 20. The ore is caught on the outer portion of the top hearth, which is an in-hearth, and it then is passed by means of the rake arms to the central opening 14, where it drops into the next lower hearth chamber. Here the rake arms are arranged to feed the ore outwardly to the outer passages 45 in the bottom of the out-hearth and again onto an in-hearth, and thus downwardly across as many hearths as are provided in the first absorber unit A. The bottom hearth of the first absorber unit is an out-hearth, and its ore passages 48 (indicated in Fig. 1 as a single passage) connect with rotary gas valves 49 made up of paddle vanes suitably rotated to feed the ore downwardly but prevent gas from passing through. Thus, the ore is fed from the first absorber A to the top in-hearth chamber of the second absorber unit B, and it is passed downwardly through this second absorber in the same way and ultimately issues through an exit passage 48 and pipe 50 into the top of the finisher C. The ore then passes through the finisher in the same progressive manner until it escapes through the outlet pipe 51 from the bottom hearth and another rotary valve 49.

It is to be observed that the central openings 14 in the in-and out-hearths are of different sizes. The opening in the in-hearth is large enough for the ore to pass downwardly therethrough, while the opening in the out-hearth is merely large enough to allow a proper insertion of the driving shaft 15. This opening in the out-hearth is sealed by any suitable construction, such as indicated in Figs. 24, 27, and 28, which comprises a cover plate 54 mounted on a supporting flange on the hearth bottom and having an upstanding flange 55 surrounding the shaft. A collar 56 (Fig. 27) is suitably secured to the shaft, and its depending flange 57 surrounds the upstanding flange 55 and thus forms a seal, effective to prevent ore from passing downwardly through the central opening. Various other constructional details may, of course, be employed to render the device efficient and operative, as will be readily understood by one skilled in this art. For convenience in assembly, the cover plates 54 and collars 56 are made in half units, as shown in Figs. 27 and 28.

Referring again to Fig. 1, the device as illustrated is primarily intended for the chloridizing of oxidized ores, such as a roasted complex sulfide ore, in which the ore is treated in the first absorber A with the residual gases coming from the second absorber B and the finisher C; after which the ore intermixed with ferric oxide is treated in the second absorber B with strong hydrochloric acid gas. Then the material is heated in the finisher to a temperature at which the ferric chloride formed in the second absorber dissociates in the presence of air and produces nascent chlorine which attacks the refractory components, such as the residual sulfides and zinc-iron compounds present in the ore, to convert them to chlorides. For the proper introduction of the reagent gas, a pipe 60 connects with the opening 61 through the top cover plate of the second absorber, as shown in Figs. 1, 20, and 22, and any residual hydrochloric acid gas passes downwardly with the ore through the pipe 50 into the top hearth chamber of the finisher, and then escapes through the exit pipe 62, through an opening in the finisher top cover plate corresponding with the opening 61 of the second absorber. This pipe 62 connects preferably with the top unit of the first absorber A, in accordance with which the gas enters through the top cover plate and passes downwardly through the first absorber, and finally outwardly through an exit pipe 64, as shown in Fig. 1, which communicates with the lower hearth chamber of the first absorber. Air in the required amount is fed through a pipe 65 into the bottom hearth chamber of the finisher C, and this air is caused to pass upwardly through the finisher in a countercurrent flow relative to the descending ore. The chlorine gas, as well as any water vapor, hydrochloric acid gas, excess air etc. which are present in the top hearth of the finisher, are caused to pass outwardly through pipe 62 because of the reduced pressure in the first absorber, as produced by a fan or other device connected to pipe 64.

A primary feature of this invention involves a proper control of the temperatures in the different units and to this end each one of the reaction chambers is jacketed so that it may be substantially surrounded by heating or cooling materials. In the present case, it is preferred to have the finisher heated to a temperature such as 250° C. or higher by means of hot air passing inwardly through the pipe 67 and into the hollow walls of the jacket. This heating gas, after traversing through the finisher walls, may then be passed through pipe 68 to the first absorber so as to heat the first absorber as required. The gas from the pipe 68 enters the lower port 69 in the hearth bottom of the first absorber, and after passing through the hollow walls thereof escapes through the port 70 in the top hearth cover.

It is preferred, in the present construction, to cool the second absorber B by water, although any other suitable medium may be employed. In the present case, water enters through pipe 71 into the top port 70 of the second absorber, and this water spreads into the four quadrant sectors of the top hearth cover and thus is fed into each one of the quadrant columns, as will be explained hereinafter. Then, the water passes downwardly serially through the outer annular passages and hollow hearth bottoms until it ultimately escapes through the pipe 74. The directions of the water flow or heating gas flow may, of course, be suitably modified as desired, but it is found that the reaction in the second absorber is better controlled by this arrangement, and particularly since it prevents the formation of steam within the cooling jacket and keeps the ore material at a temperature below that at which crystalline hydrated ferric chloride may be properly formed within the ore material.

Referring now to Fig. 2, as well as Figs. 3 to 19 inclusive, it will be apparent that each hearth is made up of four sector castings. Each casting has a hearth bottom 80 and an upstanding inner side wall 81 which in conjunction with the bottom of the hearth unit above forms a reaction chamber. The hearth bottom 80 extends outwardly beyond the inner wall 81 to meet the outer wall 82. A top wall 83 cooperates with the other walls shown to form an outside annular heating chamber 87 which serves to conduct the heating or cooling fluid. Similarly, a bottom wall 84 on the casting cooperating with walls 80 and 82 and the inner wall 85, which defines the central opening 14, serves to form a hollow hearth bottom for cooling or heating the hearth. The end walls 100 close the ends of the chambers. The wall 80 separates the hollow space 86 beneath the hearth from the hollow space 87 between the walls 81 and 82, but these are connected by openings 88 in the wall 80. Each bottom out-hearth port 69, formed by a depending circular tube, communicates with the space 86 for the passage thereto of a cooling or heating medium, as shown in Fig. 1. Within each of the quadrant sectors are two baffles 89 between the walls 80 and 84 extending radially inwardly from the outer wall 82, but spaced from the inner wall 85. It will thus be apparent from inspection of Figs. 3 to 6 inclusive showing the bottom out-hearth that a heating medium passing inwardly through the pipe 69 (Figs. 1, 3, and 4) must pass around these baffles 89 before it can go through the openings 88 (Figs. 3 and 5) formed in the wall 80 which connects the spaces 86 and 87. This heat transfer medium then escapes through the passage 90 (Fig. 4) in the top wall 83 and into an opening 91 in the bottom of the next hearth above (Figs. 7 and 8).

Referring to Figs. 3 and 24, it is to be noted that two out of the four quadrant sectors are provided with openings 94 covered by doors 95 for inspection and removal of the rake arms. These doors (Fig. 25) are suitably held in place by hinges and clamping devices 96 to prevent the escape of gases from the apparatus. As shown in Fig. 24, the tubular passage 94 is carried through the outer heat transfer chamber 87; but in order that the heat transfer medium may pass around the tube 94, a small passage 98 is provided beneath the tube 94. This also necessitates that the outlet ports be so made in each of the quadrants, which have the passages 94, as to form two separate passages 99 (Fig. 3), but the functions of these passages 90 and 99 are the same. Similarly, two spaced ports 103, which correspond in function with ports 91, may be provided in the bottoms of the two door sectors, so as to communicate properly with the correspondingly spaced passages 99 in the hearth sector below. This construction is also found in the two diametrically opposite door sectors of each hearth unit, whether an in-hearth or an out-hearth, as shown in the drawings. It is also to be noted that the ore passages 48 are formed between the quadrant sectors of the bottom out-hearths, as illustrated clearly in Figs. 3 and 6, by curving the outer end walls 100 of the adjacent sectors to form a tube.

The in-hearth 10 is constructed somewhat similarly, as shown in Figs. 2 and 7 to 10 inclusive. Each in-hearth is provided with an opening 91 in its bottom wall which aligns with the opening 90 (Figs. 4 and 13) in top wall of the out-hearth below it. Similarly, the opening 90 in the top of the in-hearth communicates with opening 91 in the bottom of the out-hearth thereabove (Figs. 11 and 14). It will thus be seen that when the heat transfer medium passes upwardly into the opening 91 of the out-hearth and around the baffles 89, it escapes through openings 88 into the passage 87, and then outwardly through opening 90 of the out-hearth and into opening 91 of the in-hearth thereabove, and then through that hearth and finally through opening 90 into the bottom opening 91 of the next out-hearth above and so on, depending on the number of hearths employed.

It is also to be noted that all of the hearth sectors are provided with radial depending flanges 105 and side flanges 106 and circumferential flanges 107 which are provided with suitable bolt holes so that the sectors may be fastened together with bolts or other devices to form a sector unit and so that sector units piled on one another may be made into a rigid assembly. Also, various heat and gas insulating materials may be employed to prevent the escape of heat and gas from the apparatus.

The out-hearth and in-hearth sectors differ in their arrangements for passing the ore downwardly therethrough. The intermediate out-hearths, but not the bottom out-hearths, are provided with circular openings 45 within the baffles 89, as shown, while the in-hearths have the openings 14 sufficiently large for the passage of ore therethrough. The intermediate out-hearths (shown in Figs. 11 to 15 inclusive) differ from the bottom out-hearth shown in Figs. 3 to 6 inclusive in that the former do not require the ports 69 (Figs. 1, 3, and 4), which are replaced by ports 91 above described. The ore passages 48 of Figs. 3 and 6 are not located within the baffles, as in the standard or intermediate out-hearths, but they are formed of two semi-cylindrical grooves in the adjacent sector walls which combine to form the tubular passages 48, as shown. Except as to the ports and pasages above described, the intermediate out-hearth shown in Figs. 11 to 15 inclusive is the same as the bottom out-hearth shown in Figs. 3 to 6.

The top in-hearth of each of the units differs from the intermediate in-hearths only in the same general way as required for the passage of heating gas therethrough. As shown in Figs. 16 to 19 inclusive, the top in-hearth has bottom ports 91 corresponding with similar ports in the other hearths. The top ports 110 are formed as two divided passages located on opposite sides of the gas inlet 61 (Fig. 20) but otherwise correspond with ports 90 in the other in-hearths. That is, one quadrant (Fig. 16) has its outlet gas ports located differently to provide for the flow of gas through passage 61 in the top hearth cover. The other sectors are the same as those shown in Figs. 7 to 10 inclusive.

The top hearth of each of the units is covered over by a cover plate, as shown in Figs. 20 to 23 inclusive, which is especially arranged for the transmission of the heating gases as well as the ore. This comprises iron castings 120, 121, and 122 formed as quadrant sectors which serve as a cover for each of the sector units beneath. Pipes 43 communicating through the duplicate diametrically opposed cover sectors 121 connect the ore feeding apparatus with the hearth chamber. A hollow tubular chamber 125 is provided in each casting, and one of them communicates with the port 70 for carrying the heating gas from the unit. As shown in Fig. 23, this passage 125 in each sector opens through the outer wall 126 at each end of the quadrant and thus forms an annular passage entirely around the four quadrants, so that the heating or cooling fluid may be exhausted from all of the quadrants into the single outlet 70. The passage 61 (Figs. 20 and 22) communicating with the pipe 62, as shown in Fig. 1, is so formed in the casting that the chloridizing gas may enter directly into the hearth chamber of the absorbers A and B. In the finisher C, the gas is exhausted through the port 61.

The spaced openings 127 (Figs. 20 and 23) through the cover plate sector 122 of the absorber A serve to lead the heating or cooling medium into the annular passage 125, from which it travels to port 70. In the second absorber B, the cooling fluid flows inwardly through the passage 70 and the spaced openings 127. The finisher construction serves the same as does the first absorber A. The spaced openings 128 in sectors 121 serve the same as ports 127 to receive the gas from the top hearth ports 99 from which it travels into and through the annular chamber 125. The port 129 in the sector 120 (Figs. 20 and 22) connects the top hearth port 90 with the passage 125. These various ports 127, 128 and 129 are required because the vertical columns of sectors are so arranged that their heating and cooling fluids do not intercommunicate directly between the sectors of the same hearth unit.

It is also to be understood that, although the diagrammatic Fig. 1 shows the gas pipe 68 connected to one port 69 on the bottom hearth of absorber A, this pipe 68 will have at its upper end four branches to connect with the four ports 69 on the bottom hearth of absorber A. Also, there are four ports 69 in the bottom out-hearths and suitable water or air connections will be made with each. Only one water inlet pipe 71 is required because of the special shape of the cover plate, which has a continuous annular passage 125 therein. Hence, the sector constructions are such that each vertical pile of sectors may be heated and cooled independently of the adjacent sectors of another pile. If desired, however, the sector heating and cooling passages may be made to communicate with each other laterally, the same as is provided by the passage 125, whereby water or hot air will flow directly through openings in the end walls 100 from the passage 87 in one sector quadrant to the corresponding passage 87 in the adjacent quadrant. Various other modifications will be readily apparent.

The operation of this device will be apparent from the above disclosure. In general, this apparatus comprises a plurality of multiple hearth units which communicate with one another and form a series of ore treatment or reaction chambers. Each multiple hearth unit has its own driving shaft and set of rake arms, so that the movement of the ore in each of the multiple hearth units may be controlled independently of the operation of the other parts of the apparatus. For example, one may revolve the set of rakes in the first absorber at a different rate from that in the second absorber, and the angle of the rake blades may be so regulated that the faster moving set of rakes will serve to agitate the material more thoroughly but not move it into the next portion of the apparatus at a rate too fast for the capacity of the second portion. Furthermore, the rakes may be adjusted vertically toward and away from the hearth bottom in each of the various hearths of the apparatus so as to further vary the operation within the reaction chamber. By adding more rake arms or removing some, the stirring operation may be further regulated. Without having the driving shafts made independent of each other, the control of the chemical reactions could not be accomplished as satisfactorily.

Similarly, each of the various multiple hearth units may have its temperature controlled entirely independently of the condition in any of the other units, and it may be regulated as desired. It, of course, is feasible to tap a connecting pipe for hot or cooling gases and liquids into any of the heat exchanging chambers. Hence, the diagrammatic showing of Fig. 1 and the constructions illustrated in the other figures are to be taken as merely illustrative of a preferred embodiment of this invention. Such modifications will be made in the different castings as are required to satisfy the particular materials being treated. This is particularly true where one requires a progressively decreasing or increasing temperature in any of the sets of reaction chambers or where it is desired to have the temperature substantially the same throughout a given set of hearth units. It will also be appreciated that the length of time during which the material may be treated in any of the different multiple hearth units will be determined in part by the number of hearths assembled in that particular unit. This construction lends itself particularly well for building up a multiple unit to any required size, and it is comparatively easy to change the construction for treating a different ore, which requires a special treatment. All of the parts may be made of suitable castings of iron or other proper metal, which may be modified as required in the foundry or for purposes of assembling the unit. It will also be apparent that the constructions of the different in- and out-hearths may be suitably modified, as required for any particular ore. By making the entire apparatus of these small hearth sectors, it is possible to build up a construction in various arrangements which will suit the particular needs of the occasion.

Although the apparatus has been illustrated in the drawings as pertaining to a complicated chloridizing process, it will be appreciated that these hearth sectors or hearth units, as well as the shafts, etc., may be assembled in simpler or more complicated relationships, depending upon the operation desired. This multiple hearth construction is particularly suited for roasting a sulfide or other ore with air at such a temperature as is suited for the operation, or for treating a raw or a roasted ore with various types of gases, and particularly where carefully controlled temperature conditions are required. Also, the apparatus is well adapted for drying wet materials or for desiccating various chemicals. In such cases, it may be sufficient to arrange a desired multiplicity of the hearth quadrants or sectors in a single stack arrangement and to pass the drying medium in the required direction through the heat interchanging chambers. Numerous modifications will be apparent to one skilled in this art, and this invention is not to be considered as limited, except as specified in the claims appended hereto. Also, it is to be understood that since the apparatus is useful for treating various other materials besides ores, the claims are to be interpreted as covering an apparatus employed for treating all such materials as it is capable of handling, if constructed as described or illustrated or with such modifications as would be readily apparent to one skilled in the art. Hence, the expression "ore treatment apparatus" is to be considered only as illustrative of one use to which the apparatus may be put.

Having thus described the invention, what is claimed as new and desired to obtain by Letters Patent is:

1. An ore treatment apparatus comprising a plurality of intercommunicating multiple hearth units, each multiple unit comprising a set of hearths located one above another and providing a series of communicating reaction chambers, separate devices including revolving rakes in each of the units which are arranged to move ore progressively from one hearth to the next below, and a driving mechanism for each of said devices which is controlled and operated independently of the other mechanisms, whereby the stirring and the movement of ore in the different hearth units may be separately regulated.

2. An ore treatment apparatus of the type covered by claim 1 in which the sets of revolving rakes in the different hearth units are mounted on separate shafts and each shaft is independently rotated by an individual driving mechanism.

3. An ore treatment apparatus comprising a plurality of vertically arranged, intercommunicating multiple hearth units, each unit comprising a set of hearth floors and side walls which form communicating reaction chambers, a set of rakes revolvably movable over each hearth floor, a separate driving shaft for the set of rakes in each of the multiple hearth units, each hearth floor having a central opening for the shaft, and the alternate hearths having central and outer openings respectively which are arranged for feeding the material back and forth across the hearths and from one hearth to another, and separately controlled driving mechanisms whereby each shaft may be revolved independently and the ore treatment in each multiple hearth unit may be separately governed.

4. An ore treatment apparatus comprising a plurality of multiple hearth units, each having vertically spaced hearths provided with central and outer openings therethrough for the passage of ore, a separate shaft in the central hearth openings of each multiple hearth unit, rake arms mounted on each shaft and having rakes thereon depending to a position adjacent the hearth floors and arranged to move the material progressively from one hearth to another through said openings, a vertically adjustable bearing for each shaft, and means for adjusting the bearings independently so as to move the rakes toward and from the hearth floors of the different multiple hearth units.

5. A sector casting for a chemical apparatus comprising spaced top and bottom walls and spaced side walls forming a hollow casting which is substantially L-shaped in vertical section and is constructed for assembly with other castings to form a hollow hearth and a hollow, annular, vertical wall of a jacketed reaction chamber, said casting having inlet and outlet ports and a passage for the circulation of a heat exchange fluid therein.

6. A sector casting of the type covered by claim 5 in which the hearth has an inner vertical wall so shaped that the assembled sectors provide an opening for a rake arm shaft and the passage of material therethrough.

7. A sector casting of the type covered by claim 5 in which a tubular wall forms a passage through the hearth adjacent to the annular wall for transmission of material therethrough.

8. An apparatus of the type covered by claim 5 in which each of a plurality of sector castings arranged to form the hearth and annular wall of a reaction chamber has end, side, top and bottom walls enclosing the heat exchange fluid therein, together with ports in the top and bottom walls for supplying fluid thereto from a vertically adjacent sector, the end walls being imperforate so that the passages within one sector do not directly communicate with those of another in the same municate with those of another in the same hearth unit.

9. An apparatus of the type covered by claim 5 in which the sector casting has a baffle structure within the passage for the heat exchange fluid which is so arranged relative to the inlet and outlet ports as to cause the fluid to circulate extensively within the hollow hearth bottom.

10. An ore treatment apparatus comprising a sector shaped metal casting having hollow walls forming a portion of a hearth floor and a portion of an annular wall, which is so shaped and constructed that a plurality of these sector castings may be assembled to form a complete hearth bottom and an annular side wall and be piled vertically with a similar set of sector castings to form an enclosed reaction chamber, each of said castings having bottom, top and side walls so arranged as to form a passage which exchanges heat with the adjacent portion of the reaction chamber, and having openings through its walls for communicating with aligned openings in an adjacent casting, whereby a large sized apparatus of any desired number of hearth units may be formed by assembly of the sector castings.

11. A chemical treatment hearth unit of the type covered by claim 10 in which each sector casting is so constructed that the heat exchange medium does not pass laterally from one sector to another but is provided with openings so arranged that a plurality of sector units may be mounted in a vertical column for the passage of a heat exchange medium vertically therethrough without relation to the passage of a heat exchange medium through an adjacent vertical column of sectors.

12. An ore treatment apparatus comprising a plurality of sets of sector castings shaped for assembly as the hearth, top and side walls of a vertical series of intercommunicating reaction chambers forming a multiple hearth unit, the sectors of each hearth having vertical walls which cooperate when assembled to form a series of central openings for a rake arm shaft, the individual sectors of one hearth being shaped to provide a centrally located ore passage and the sectors of an adjacent hearth providing an outer ore passage, whereby ore may be raked in opposite directions across alternate hearths and transferred through said openings from one to another.

13. An apparatus of the type covered by claim 12 in which the sector castings have hollow walls and inlet and outlet ports forming passages for a heat exchange fluid, the ports of two vertically adjacent sectors forming a communicating passage for the transfer of fluid from one hearth unit to the next above.

14. An apparatus of the type covered by claim 12 in which the sector castings are arranged in several vertical columns to form the reaction chambers and the sector castings of one column have communicating ports for the circulation of heat exchange fluid throughout the column, but said sector castings have imperforate side walls whereby said fluid cannot circulate from one column to the next adjacent column of sector castings.

15. An ore treatment apparatus comprising a plurality of multiple hearth units, each of which has a set of hearths located one above another and provided with openings which form a series of intercommunicating reaction chambers, means for introducing reagent gas into each of the multiple units independently of the other units and for removing the gas therefrom, means including revolvable rakes to move the ore material from one hearth to another within each multiple unit, means whereby the material may move from the bottom hearth of one multiple unit to the top hearth of the next multiple unit therebeneath without permitting the passage of material amounts of reagent gas, means including jacketing walls for controlling the temperature within each multiple unit, and means for introducing a heat exchange fluid within the jacketing walls of each multiple unit so that the temperatures of each unit may be separately controlled.

THOMAS A. MITCHELL.